(12) United States Patent
Kawaguchi et al.

(10) Patent No.: US 11,916,897 B2
(45) Date of Patent: *Feb. 27, 2024

(54) ISOLATING NETWORKS AND CREDENTIALS USING ON-DEMAND PORT FORWARDING

(71) Applicant: Microsoft Technology Licensing, LLC, Redmond, WA (US)

(72) Inventors: Chang Chuen Kawaguchi, Redmond, WA (US); Lee Jonathan Riefberg, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/583,644

(22) Filed: Jan. 25, 2022

(65) Prior Publication Data
US 2022/0217129 A1 Jul. 7, 2022

Related U.S. Application Data

(63) Continuation of application No. 15/788,138, filed on Oct. 19, 2017, now Pat. No. 11,265,310.

(51) Int. Cl.
*H04L 9/40* (2022.01)
*H04L 67/01* (2022.01)
*H04L 47/10* (2022.01)

(52) U.S. Cl.
CPC ............ *H04L 63/083* (2013.01); *H04L 47/10* (2013.01); *H04L 63/02* (2013.01); *H04L 63/08* (2013.01); *H04L 63/102* (2013.01); *H04L 63/107* (2013.01); *H04L 63/205* (2013.01); *H04L 67/01* (2022.05)

(58) Field of Classification Search
CPC ....... H04L 63/083; H04L 63/02; H04L 63/08; H04L 63/102; H04L 63/107; H04L 63/205; H04L 47/10; H04L 67/01
See application file for complete search history.

(56) References Cited

U.S. PATENT DOCUMENTS

| | | | |
|---|---|---|---|
| 2014/0282976 A1* | 9/2014 | Holmelin | H04L 63/08 726/7 |
| 2017/0063798 A1* | 3/2017 | Lapidous | H04L 63/029 |
| 2018/0205736 A1* | 7/2018 | Elyashar | G06F 21/6281 |
| 2019/0109833 A1* | 4/2019 | Segu | H04L 63/08 |
| 2019/0173888 A1* | 6/2019 | Li | H04L 61/2557 |

* cited by examiner

*Primary Examiner* — Philip J Chea
*Assistant Examiner* — Sangseok Park
(74) *Attorney, Agent, or Firm* — Christopher J. Volkmann; Kelly, Holt & Christenson, PLLC

(57) ABSTRACT

An allowed client server, that is authorized to access a resource server over a given port, receives a client request, from a client computing system, to access the resource server. The allowed client server authenticates and authorizes the request, using an authentication and authorization mechanism, and selects a port with which to communicate with the client computing system. The identity of that port is provided to the client computing system, and a port forwarding mechanism forwards traffic between the client computing system and the resource server, through the client-facing port and to the given port on the resource server.

20 Claims, 8 Drawing Sheets

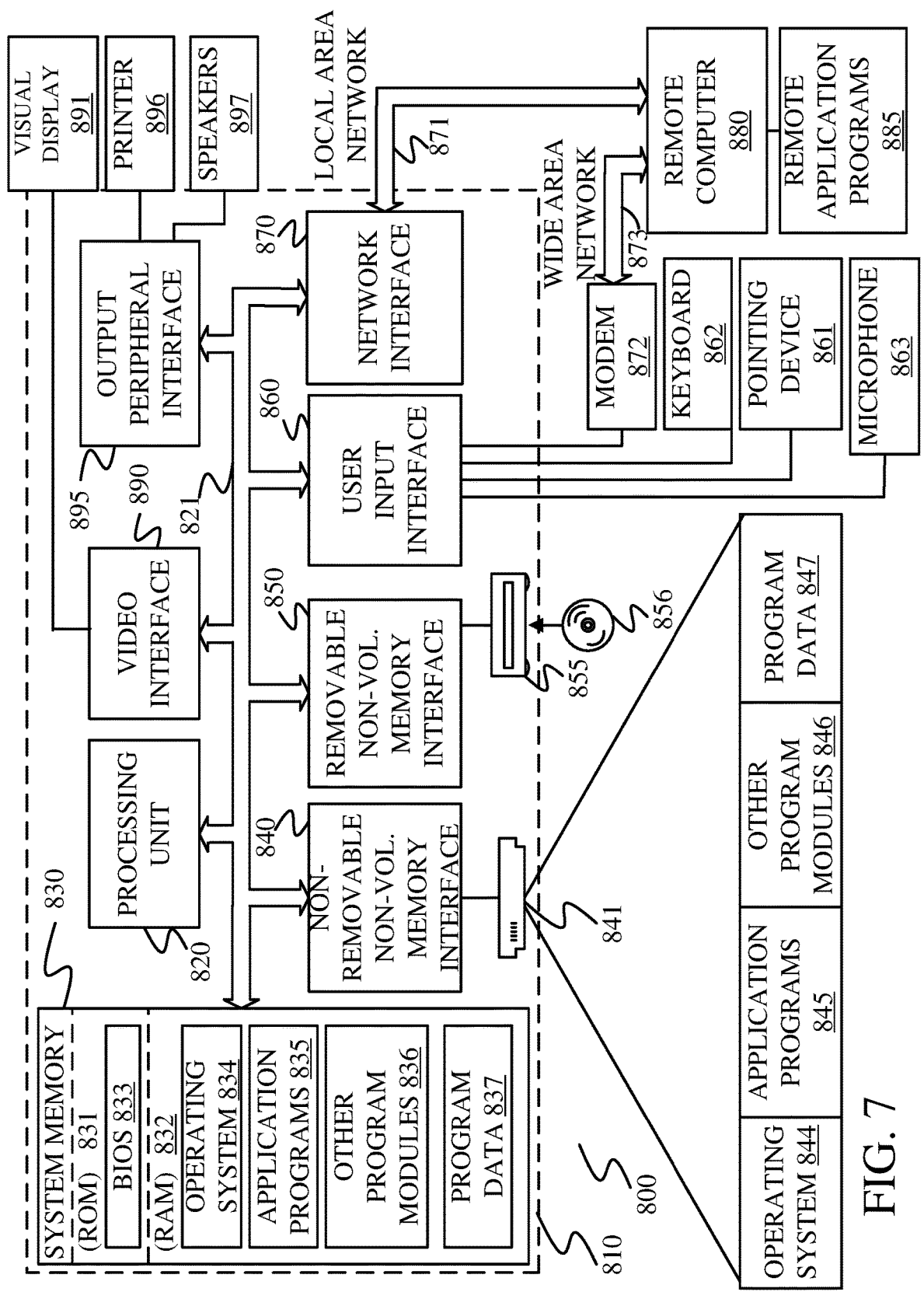

ISOLATING NETWORKS AND CREDENTIALS USING ON-DEMAND PORT FORWARDING

CROSS-REFERENCE TO RELATED APPLICATION

The present application is a continuation of and claims priority of U.S. patent application Ser. No. 15/788,138, filed Oct. 19, 2017, the content of which is hereby incorporated by reference in its entirety.

BACKGROUND

Computing systems are currently in wide use. Some computing systems include servers that host or otherwise serve resources to users.

In situations where computing systems include resource servers, there are many times when management or administration operations must be performed on the logical and structural components of the hosted service, on the resource servers or on the resources themselves (for purposes of the present discussion, all the logical and structural components of the hosted service will be included in the term "resource server"). In order to allow such management or administration operations, various management ports are accessed by management or administrative personnel from various locations, where the management or administration users reside.

However, it can be difficult to know where those individuals are making access requests from. This can lead to access permissions that are overly broad. For instance, in a service or resource server that uses an access control list to grant permissions, because it is difficult to identify a particular IP address for a given administrative or management user, access control list entries may be written for multiple different IP addresses, and those access control list entries may never be removed. This results in persistent and often overly broad access control list entries, which compromises security.

In systems or services where access control lists are not used, but other mechanisms are used for granting access to a resource or a resource server, overly broad and persistent permissions may be granted as well, for the same reasons. Thus, even in those systems, security is compromised.

The discussion above is merely provided for general background information and is not intended to be used as an aid in determining the scope of the claimed subject matter.

SUMMARY

An allowed client server, that is authorized to access a resource server over a given port, receives a client request, from a client computing system, to access the resource server. The allowed client server authenticates and authorizes the request, using an authentication and authorization mechanism, and selects a port on which to communicate with the client computing system. The identity of that port is exposed to the client computing system, and a port forwarding mechanism forwards traffic between the client computing system and the resource server, through the client-facing port and to the given port on the resource server.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 7 is a block diagram of one example of a computing environment that can be used in the architectures shown in the previous figures.

DETAILED DESCRIPTION

Figure 1:
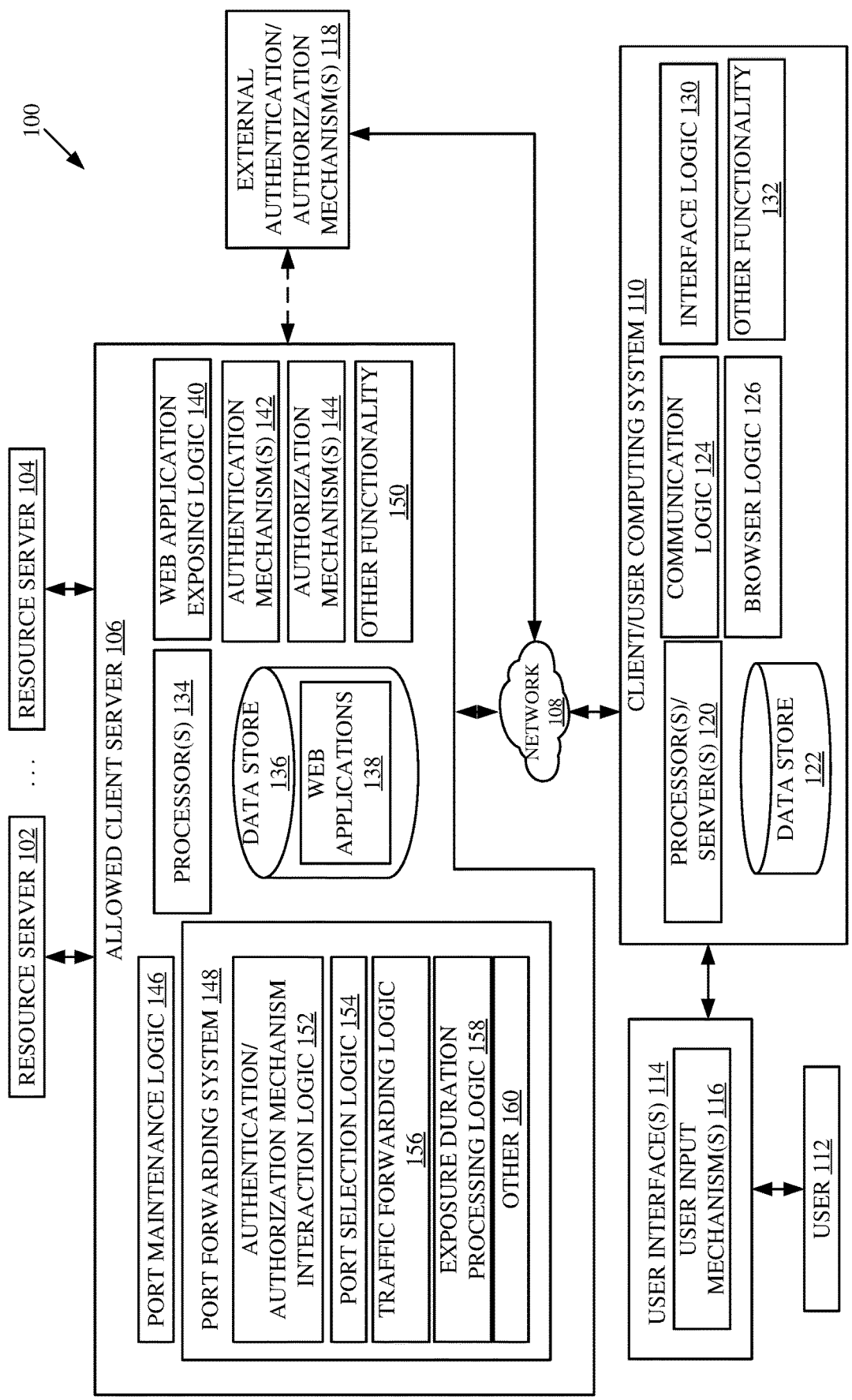
FIG. 1 is a block diagram of one example of a computing system architecture.

FIG. 1 is a block diagram of one example of a computing system architecture 100. In architecture 100, a set of resource servers 102-104 provide access to resources. In one example, resource servers 102-104 are configured so that they are allowed to communicate over a given port with allowed client server 106. Allowed client server 106, itself, interacts over network 108, with one or more client/user computing systems 110, so that a user 112 can access resource servers 102-104 (such as to perform maintenance or administrative operations on those servers, or otherwise) as is further described below.

FIG. 1 also shows that, in one example, client/user computing system 110 generates user interfaces 114, with user input mechanisms 116, for interaction by user 112. User 112 illustratively interacts with the user input mechanisms 116 in order to control and manipulate client/user computing system 110, and portions of allowed client server 106 and one or more of the resource servers 102-104. FIG. 1 also shows that, in one example, allowed client server 106 can authenticate and authorize requests received from client/user computing system 110 by using one or more different internal mechanisms (discussed below) or external authentication/authorization mechanisms 118.

Before describing the overall operation of architecture 100 in more detail, a brief overview of some of the items in architecture 100, and their operation, will first be provided. Network 108 can be any of a wide variety of different networks that provides communication between allowed client server 106 and client/user computing system 110 and, in some cases, external authentication/authorization mechanisms 118. Therefore, in one example, network 108 can include a wide area network, a local area network, a cellular communication network, a near field communication network, or a wide variety of other networks or combinations of networks.

Client/user computing system 110 illustratively includes one or more processors 120, data store 122, communication logic 124, browser logic 126, user interface logic 130, and it can include a wide variety of other functionality 132. Communication logic 124 illustratively allows client/user computing system 110 to communicate over network 108. It can also allow computing system 110 to communicate over other networks or in other ways. Browser logic 126 illustratively runs a browser and user interface logic 130 illustratively generates user interfaces 114 and detects user interactions with user input mechanisms 116. It can provide an indication of those interactions to other items in client/user computing system 110 or other systems.

FIG. 1 shows that allowed client server 106 can include one or more processors (or servers) 134, data store 136 (that can store one or more web applications 138), web application exposing/running logic 140, one or more authentication mechanisms 142, one or more authorization mechanisms 144, port maintenance logic 146, port forwarding system 148, and it can include a wide variety of other functionality 150. In the example illustrated in FIG. 1, port forwarding system 148 can include authentication/authorization mechanism interaction logic 152, port selection logic 154, traffic forwarding logic 156, exposure duration processing logic 158, and it can include a wide variety of other items 160.

Web application exposing logic 140 can illustratively run web application 138 and expose it, through network 108, to client/user computing system 110. The web application can be the mechanism by which the browser running on browser logic 126 requests and obtains access, through allowed client server 106, to a desired resource server 102-104.

Authentication mechanisms 142 and authorization mechanisms 144 can be any of a wide variety of different authentication and authorization mechanisms. In one example, for purposes of the present description, authentication is the process of verifying the identity of someone or something. Thus, authenticating an access request illustratively means verifying the identity of the requesting user and/or the requesting user's computing system. Authorization is the process of verifying that the requesting user (and/or the requesting user's computing system) has access to the resource server for which access is requested. The authentication and authorization mechanisms can be customized to seek different types of authentication and grant different types of authorization, based on different security policies, and based on the particular resource server for which access is being requested. In addition, instead of having its own internal authentication and authorization mechanisms 142 and 144, the web application can interact with external authentication/authorization mechanisms 118. Again, this can be based on the particular security policies being implemented, based on the requested resource server 102-104, or based on a wide variety of other criteria.

Port maintenance logic 146 illustratively maintains a pool of available ports. In one example, that pool of available ports includes network facing ports that face network 108 and the identity of which can be provided to a client/user computing system 110. The IP address of allowed client server 106, and a particular port, can be used by the client/user computing system 110 to communicate with allowed client server 106.

Port forwarding system 148 can illustratively perform port forwarding operations which forward communications received from client/user computing system 110 over a particular client-facing port to a given port on requested resource server 102 that the allowed client server 106 is authorized to use. Authentication/authorization mechanism interaction logic 152 illustratively interacts with the authentication and authorization mechanisms that are used by allowed client server 106 to authenticate and authorize the access requests received from client/user computing system 110. Once the request is authenticated and authorized, then port selection logic 154 illustratively interacts with port maintenance logic 146 to select a particular client-facing port that the client/user computing system 110 is to use to communicate with allowed client server 106. Traffic forwarding logic 156 then performs port forwarding, during which information received by client/user computing system 110 over the client-facing port is forwarded to the resource server (e.g., resource server 102) that computing system 110 has requested access to. Similarly, information received through the resource server 102 and intended for client/user computing system 110 is received from the authorized port on resource server 102, and forwarded to client/user computing system 110 on the network-facing (or client-facing) port that was selected by port selection logic 154.

Exposure duration processing logic 158 illustratively identifies a duration during which the port forwarding will be performed. It can do this in a variety of different ways. For instance, based upon the particular access requested by client/user computing system 110, the duration may be varied based on the server being accessed, the traffic protocol being used, the identity of the user 122 making the request, the properties of the user's computing system 110 or device, among other things. As an example, assume that the access request is authenticated and authorized, and it is a request that will require relatively lengthy access. In such a scenario, the duration for which port forwarding is configured to take place may be relatively long. However, if the access request is for an operation that will take a relatively short period of time, then logic 158 may set the exposure duration to be shorter. In one example, these times may be configurable, they may be fixed, they may change based upon the access request or the particular resource server that is being accessed, or they can vary in a wide variety of other ways as well.

In one example, logic 158 sets a firewall rule which permits the requested port forwarding, for the exposure duration. It can use other techniques to permit port forwarding as well, such as network address translation (NAT), or port address translation (PAT) or others. Therefore, when that duration expires, the port forwarding is disabled. For instance, the firewall rule (or the NAT or PAT) may be removed and the client-facing port selected by port selection logic 154 for communication with client/user computing system 110 is then returned by port maintenance logic 146 to the pool of available ports.

This provides a number of distinct advantages. First, it does not expose any of the resource servers 102-104 directly to network 108. Further, the allowed client server 106 can implement substantially any authentication and/or authorization mechanisms that are desired. For instance, it may be that certain organizations have security policies that indicate that certain access requests must be approved by a supervisor. This type of authentication and authorization mechanism can be embodied as a workflow that will be executed by one of mechanisms 118, 142, and/or 144 when that type of access request is received from a client/user computing system 110. In addition, the network facing (or client-facing) port exposed by allowed client server 106 to client/user computing system 110 does not expose resource servers 102-104 to network 108. Further, the client/user credentials provided during authentication by system 110 are not stored on allowed client server 106. Thus, they are less subject to surreptitious access through network 108. This is because client server 106 does not terminate transport layer security (TLS) traffic (or traffic sent using another cryptographic protocol) flowing through it. The confidentiality (or security) over network 108 is dependent on the protocol and is not impacted by the existence of client server 106.

Figure 2A:
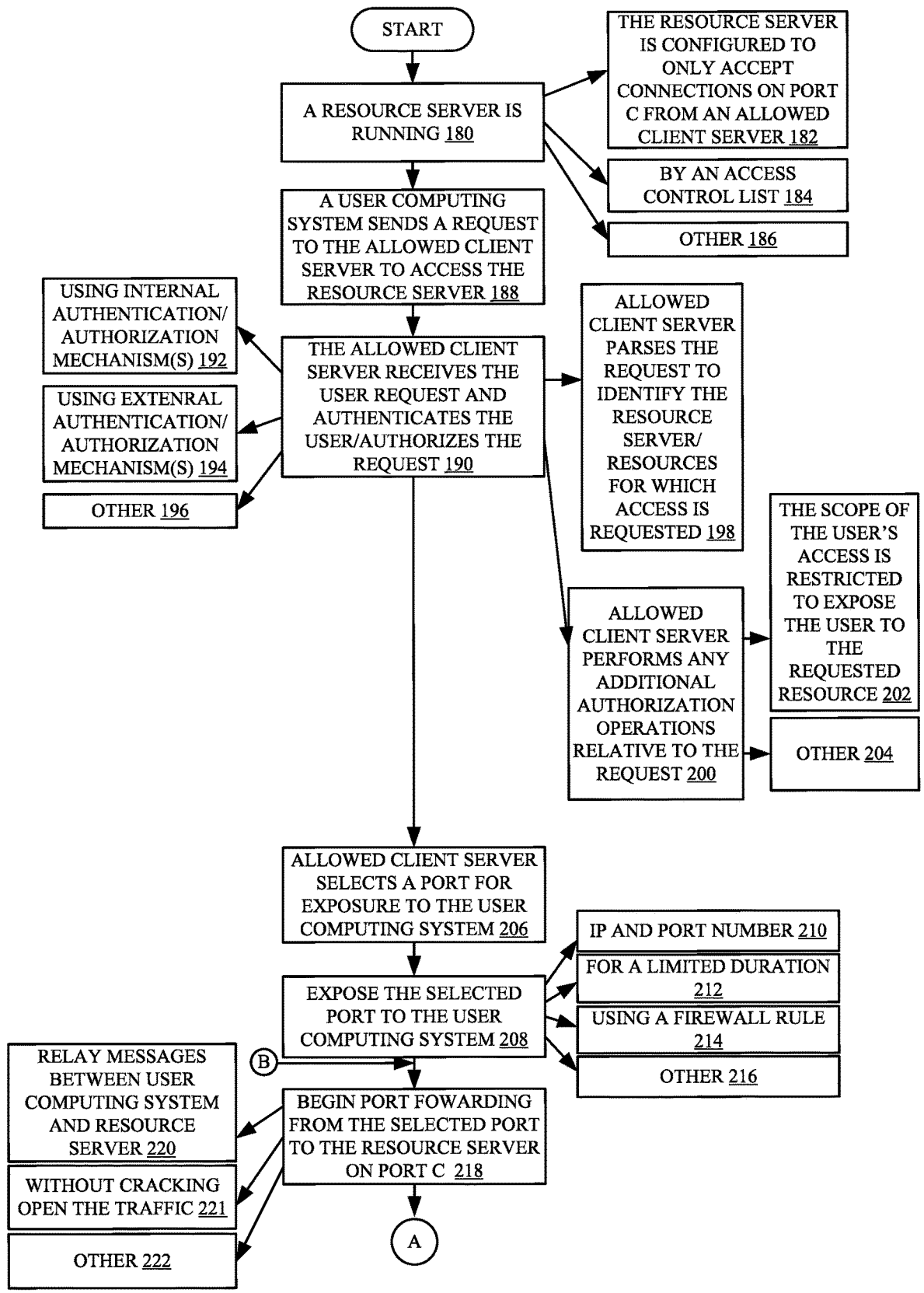
FIGS. 2A and 2B (collectively referred to herein as FIG. 2) show one example of the operation of the architecture shown in FIG. 1 in allowing a client computing system to communicate with a resource server.
Figure 2B:
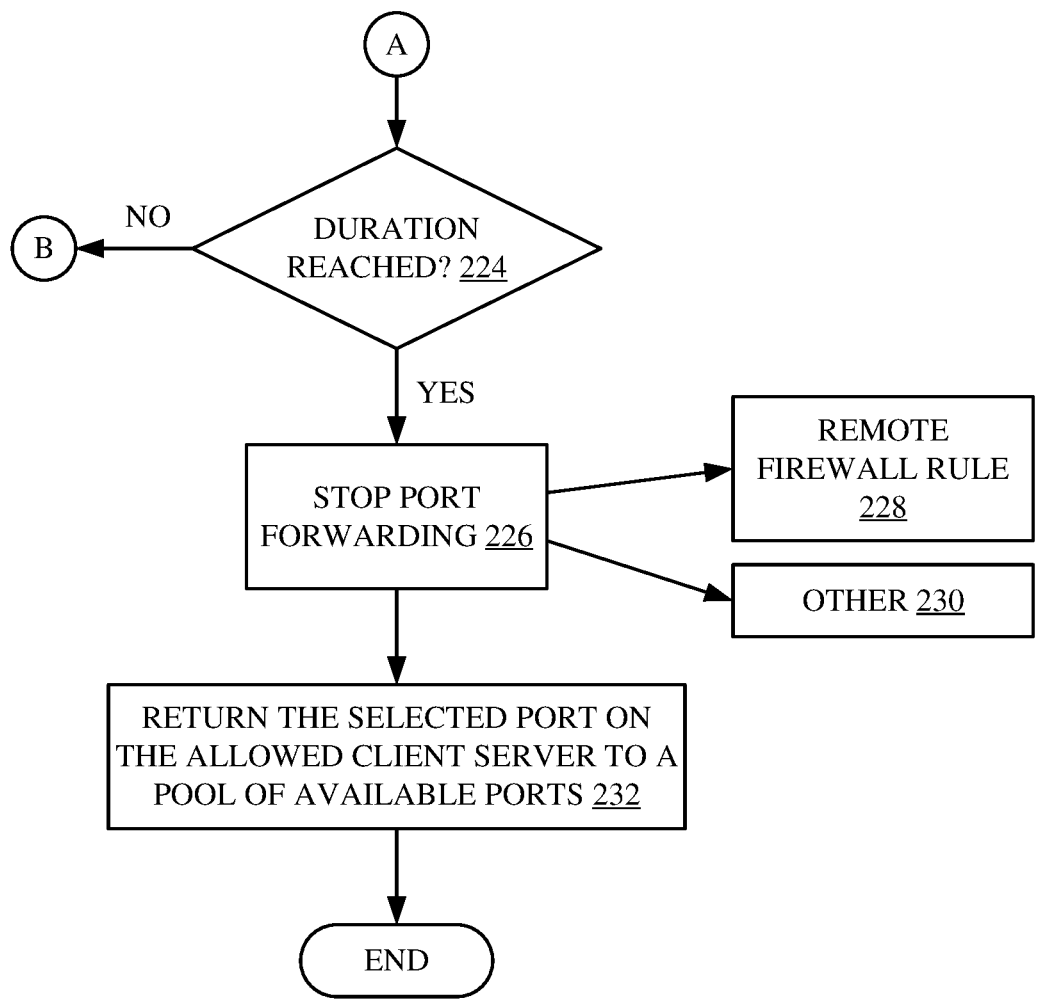

FIGS. 2A and 2B (collectively referred to herein as FIG. 2) show a flow diagram illustrating one example of the operation of architecture 100 in allowing client/user computing system 110 to obtain access to a resource server (e.g., resource server 102) using port forwarding by allowed client server 106.

It is first assumed that a resource server 102-104 is running (again, resource servers 102-104 illustratively include all back-end and front-end logical and structural components of a hosted service). For the sake of the present discussion, it will be assumed that user 112 is using client/user computing system 110 in order to request access to resource server 102. This is just an example. Having a resource server 102 running and serving access to resources is indicated by block 180 in the flow diagram of FIG. 2. The resource server is illustratively configured to only accept connections on a particular port (referred to herein, for the sake of example, as port C) from allowed client server 106. This is indicated by block 102. In one example, this type of access may be controlled by an access control list, as indicated by block 184, or by a wide variety of other security mechanisms or policies, as indicated by block 186.

Client/user computing system 110 then illustratively sends a request to allowed client server 106 to access resource server 102. This is indicated by block 188. The access request can identify the particular resource server 102. It can identify the type of management port and the type of access (e.g., which protocol) that is requested. It can identify the identity of client/user computing system 110 and user 112, and it can contain a wide variety of other items.

Also, in one example, the request may be sent through a browser running on browser logic 126. Web application exposing logic 140 in allowed client server 106 may expose web application 138 to client/user computing system 110, and client/user computing system 110 can access the web application through the browser running on browser logic 126. The access request can be sent in a wide variety of other ways as well.

Allowed client server 106 then receives the request and authenticates the user and performs any authorization operations relative to the request. This is indicated by block 190 in the flow diagram of FIG. 2. As discussed above, allowed client server 106 can use internal authentication/authorization mechanisms 142-144. This is indicated by block 192. Those mechanisms can be customized. They can be mechanisms that implement different security policies based upon which resource server is being connected to, based upon the type of access that is to be granted, among a wide variety of other things. In addition, it will be noted that allowed client server 106 can authenticate and authorize the user and access request using any of a wide variety of external authentication/authorization mechanisms 118. This is indicated by block 194 in the flow diagram of FIG. 2. The authentication and authorization mechanisms can include a wide variety of other mechanisms, and those operations can be performed in a wide variety of other ways as well. This is indicated by block 196.

In performing the authorization operations the web application in allowed client server 106 can parse the access request received from client/user computing system 110 to identify the particular resource server or resources for which access is being requested. This is indicated by block 198. It will again be noted that allowed client server 106 need not expose a web application for receiving and parsing the access request, but can also do this using a service (such as by using a representational state transfer (REST) application programming interface (API), for instance).

Mechanism interaction logic 152 can also interact with one or more authentication/authorization mechanisms to perform any additional authorization operations relative to the request, using any additional mechanisms. This is indicated by block 200. In one example, it can perform additional authorization based on the identity of the user and/or a target of the request. For instance, it can restrict the scope of the user's access that is being granted in order to expose the user to only the requested resource or to a very narrow range of resources around the requested resource. This is indicated by block 202. Other types of additional authorization operations can be performed as well, and this is indicated by block 204.

Port selection logic 154 then interacts with port maintenance logic 146 to select a particular port on allowed client server 106, from a pool of available ports, that will be used by client/user computing system 110 in order to communicate with the requested resource server 102. Selecting a port for exposure to the client/user computing system 110 is indicated by block 206 in the flow diagram of FIG. 2.

Port selection logic 154 then exposes the selected port to the client/user computing system 110. This is indicated by block 208. For instance, it can send client/user computing system 110 the IP address and port number for the particular port. This is indicated by block 210. It can expose this port to client/user computing system 110 for a limited duration which may be identified using exposure duration processing logic 158. This is indicated by block 212. As discussed above, the duration for which the port will be exposed to client/user computing system 110 can vary based on a wide variety of criteria. It can vary based upon the extent of the access requested, the complexity of the operations to be performed, the estimated duration for performing those operations, among other things, the duration can be fixed, or it can vary based upon a wide variety of other criteria or policies.

The port can be exposed to client/user computing system 110 by generating a firewall rule that permits that exposure, for the desired duration. This is indicated by block 214. The selected port can be exposed to client/user computing system 110 in a wide variety of other ways as well, and this is indicated by block 216.

Traffic forwarding logic 146 then begins port forwarding from the selected port that was exposed by allowed client server 106 to client/user computing system 110 to the port on resource server 102 on which allowed client server 106 is permitted to communicate. Beginning the port forwarding operation is indicated by block 218 in the flow diagram of FIG. 2.

In one example, this means that traffic forwarding logic 156 will forward any traffic intended for resource server 102 received on the client-facing port that is exposed to client/user computing system 110. It will also forward any communications received from resource server 102 that are intended for client/user computing system 110. This is indicated by block 220. In one example, traffic forwarding logic 156 is forwarding the traffic without cracking open or parsing the particular messages or information that is being transmitted. This is indicated by block 221. The port forwarding can be performed in a wide variety of other ways as well, and this is indicated by block 222.

This means that client/user computing system 110 is now communicating with resource server 102, but it is doing so without resource server 102 being exposed to network 108. This greatly enhances the security of resource server 102. Also, the credentials of client/user computing system 110 and of user 112 need not be maintained on allowed client server 106 because client server 106 is not terminating the traffic, but is instead forwarding packets without opening them. Further, the authentication and authorization mechanisms can be substantially any mechanisms and they can be expanded as new mechanisms are available, or they can be customized mechanisms as well. The use of arbitrary authentication and authorization mechanisms also introduces additional factors, which improve security, since a password may longer be enough to have the requested access.

Exposure duration processing logic 150 illustratively maintains exposure of the particular client facing port to client/user computing system 110 for the desired exposure duration. When that exposure duration is reached, as indicated by block 224 in FIG. 2, then traffic forwarding logic 156 stops the port forwarding operation. This is indicated by block 226. Exposure duration processing logic 158 can remove any firewall rules that permit the port forwarding operation. This is indicated by block 228. It can stop the port forwarding in other ways as well, and this is indicated by block 230.

Port maintenance logic 156 receives a signal that the client facing port is no longer being used, and it thus returns that port to a pool of available ports. This is indicated by block 232.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 3:
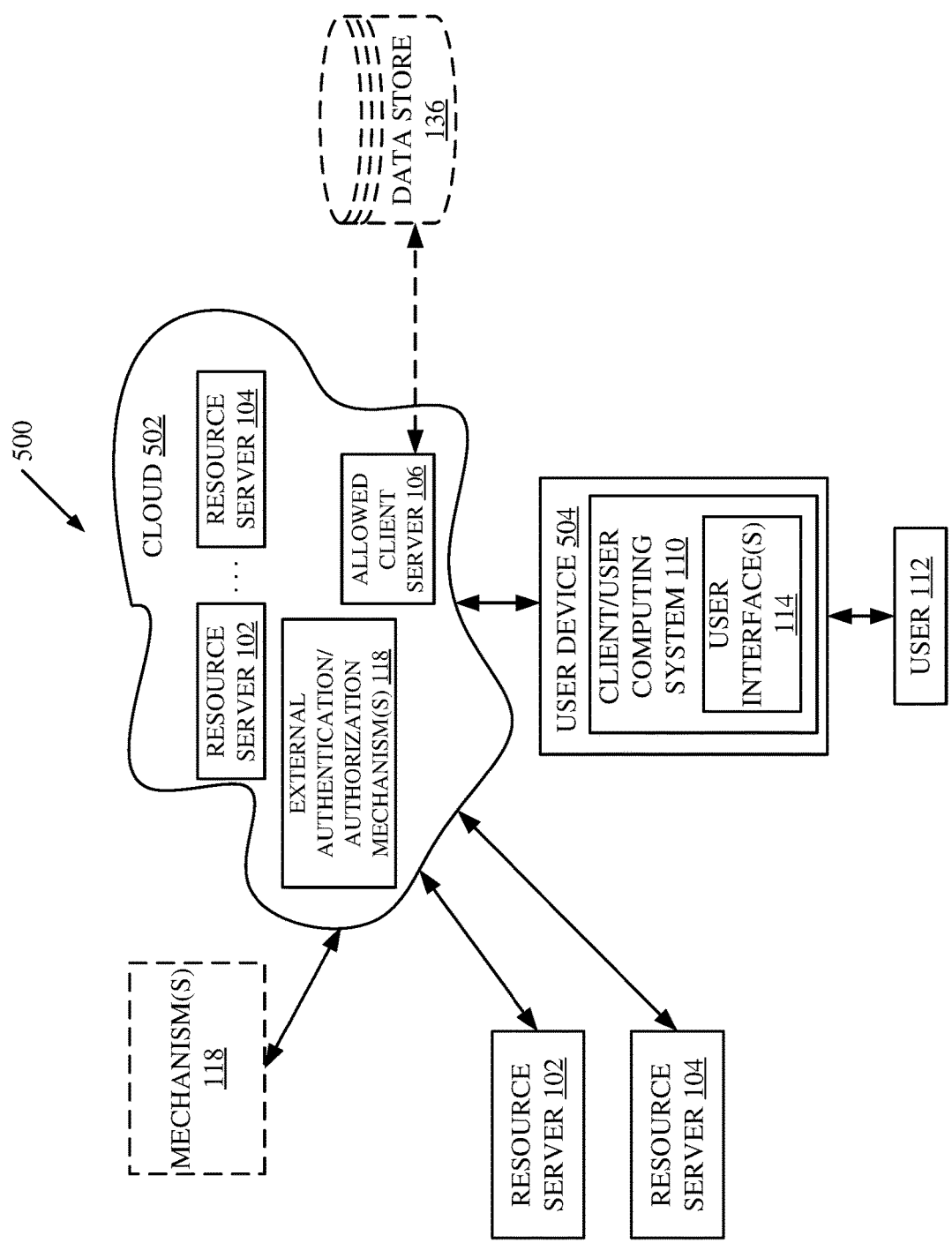
FIG. 3 is a block diagram showing one example of the architecture illustrated in FIG. 1, deployed in a cloud computing architecture.

FIG. 3 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 3, some items are similar to those shown in FIG. 1 and they are similarly numbered. FIG. 3 specifically shows that allowed client server 100, external authentication/authorization mechanism 118, and resource servers 102-104 can be located in cloud 502 (which can be public, private, or a combination where portions are public while others are private). Therefore, user 112 uses a user device 504 to access those systems through cloud 502.

FIG. 3 also depicts another example of a cloud architecture. FIG. 3 shows that it is also contemplated that some elements of architecture 100 can be disposed in cloud 502 while others are not. By way of example, data store 136 can be disposed outside of cloud 502, and accessed through cloud 502. In another example, mechanisms 118 and/or resource servers 102 and 104 can be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices.

Some of those devices include servers, desktop computers, laptop computers, tablet computers, or other mobile devices, such as palm top computers, cell phones, smart phones, multimedia players, personal digital assistants, etc.

Figure 4:
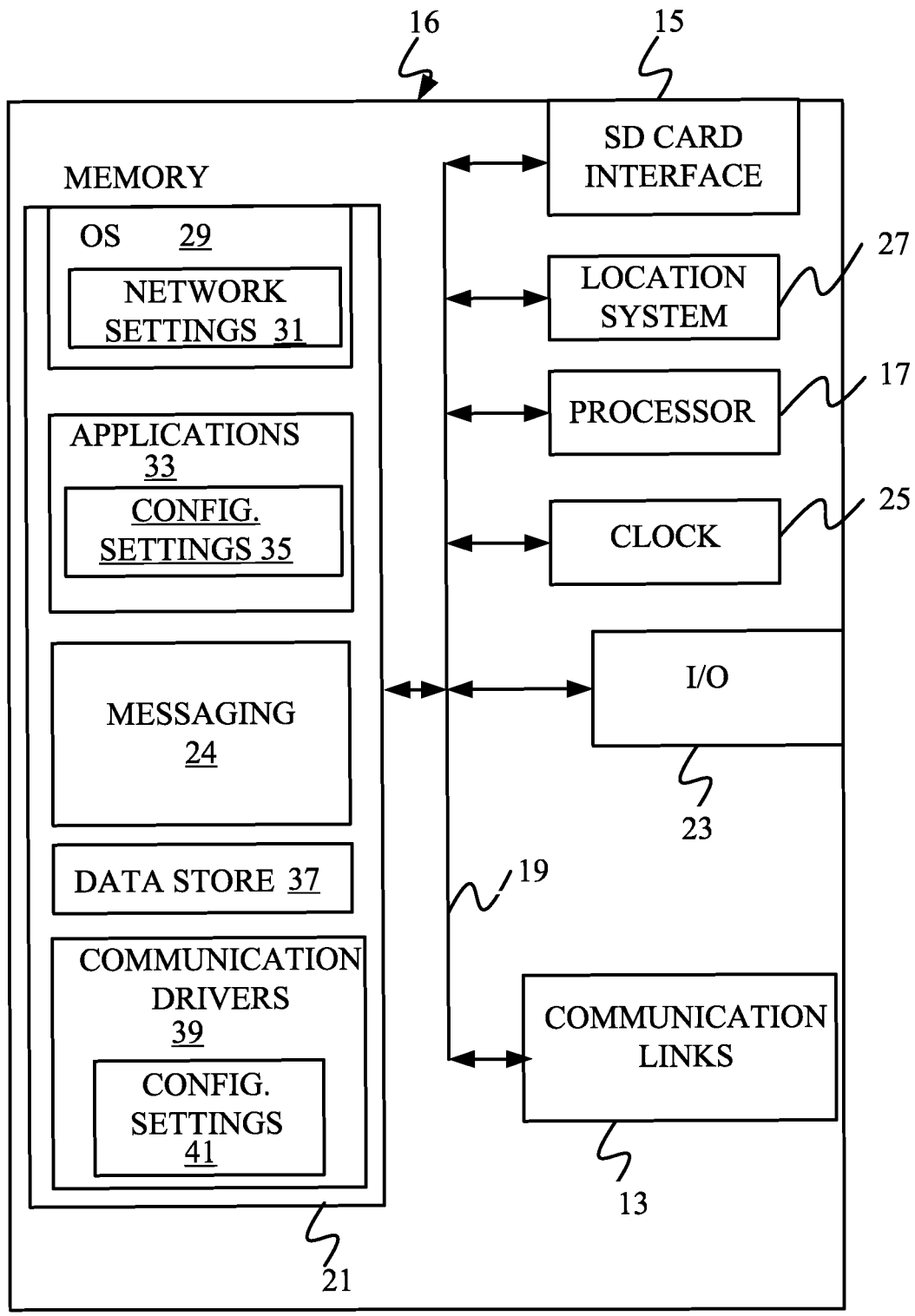
FIGS. 4-6 show examples of mobile devices that can be used in the architectures shown in the previous figures.
Figure 5:
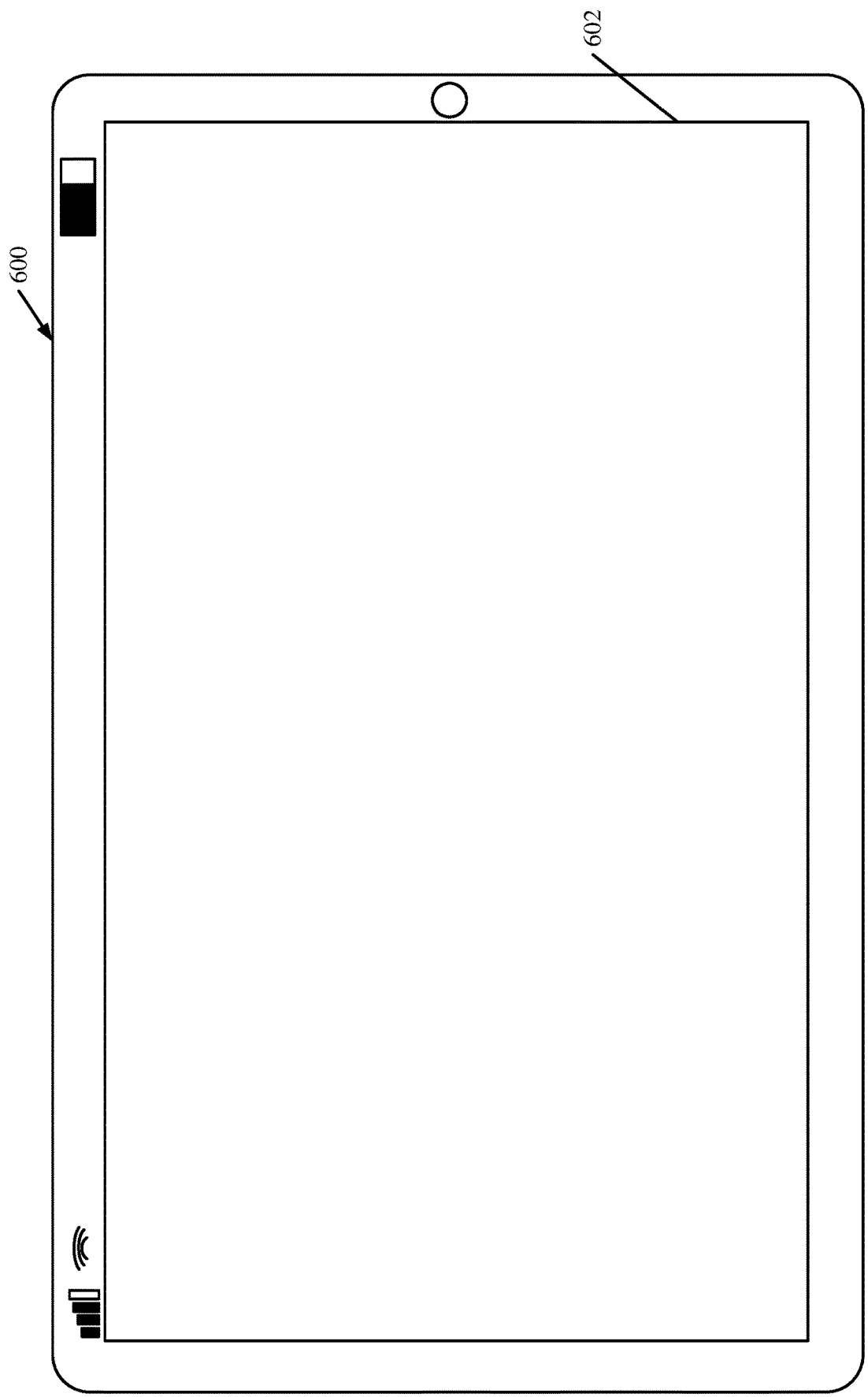
Figure 6:
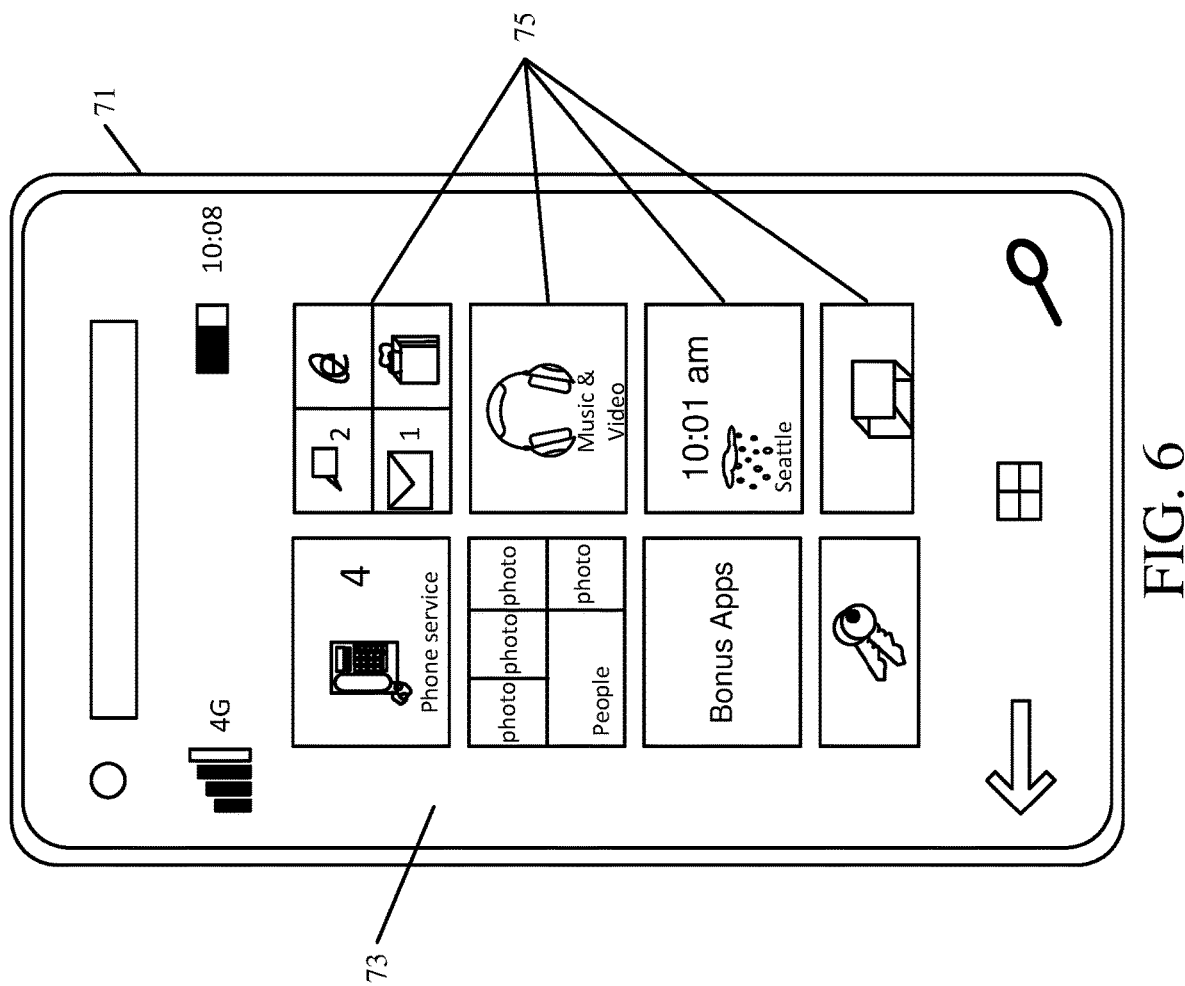

FIG. 4 is a simplified block diagram of one illustrative example of a handheld or mobile computing device that can be used as a user's or client's hand held device 16, in which the present system (or parts of it) can be deployed. FIGS. 5-6 are examples of handheld or mobile devices.

FIG. 4 provides a general block diagram of the components of a client device 16 that can run components computing system 110 or user device 504 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 5 shows one example in which device 16 is a tablet computer 600. In FIG. 5, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 6 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

FIG. 7 is one example of a computing environment in which architecture 100, or parts of it, (for example) can be deployed. With reference to FIG. 7, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 7.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 7 illustrates operating system 834, application programs 835, other program modules 836, and program data 837.

The computer 810 may also include other removable/non-removable volatile/nonvolatile computer storage media. By way of example only, FIG. 7 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 7, provide storage of computer readable instructions, data structures, program modules and other data for the computer 810. In FIG. 7, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 7 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 7 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system authorized to access a resource server on a given resource server port, the computing system comprising:
    client interaction logic that receives an access request, from a client computing system, requesting access to the resource server;
    authentication mechanism interaction logic that interacts with a selected authentication mechanism, selected based on the access request, and performs an authentication operation to authenticate information corresponding to the access request;
    authorization mechanism interaction logic that interacts with a selected authorization mechanism, selected based on the access request, and performs an authorization operation to authorize information corresponding to the access request; and
traffic forwarding logic that performs traffic forwarding by forwarding information received over a network from the client computing system on a selected client-facing port on the computing system to the resource server on the given resource server port, and by forwarding information received from the resource server through the given resource server port to the client computing system on the selected client-facing port.

Example 2 is the computing system of any or all previous examples and further comprising:
port maintenance logic configured to maintain a pool of available ports.

Example 3 is the computing system of any or all previous examples and further comprising:
port selection logic configured to interact with the port maintenance logic to select the selected client-facing port from the pool of available ports.

Example 4 is the computing system of any or all previous examples and further comprising:
exposure duration processing logic configured to expose the client-facing port to the client computing system and to enable the traffic forwarding logic to perform the traffic forwarding for a given exposure duration, after which the exposure of the client-facing port and the traffic forwarding are no longer enabled.

Example 5 is the computing system of any or all previous examples wherein the exposure duration processing logic is configured to identify the given exposure duration based on an identity of the resource server for which access is requested in the access request.

Example 6 is the computing system of any or all previous examples wherein the exposure duration processing logic is configured to identify the given exposure duration based on a type of access requested in the access request.

Example 7 is the computing system of any or all previous examples wherein the exposure duration processing logic is configured to identify the given exposure duration based on at least one of a type of access being requested, a traffic protocol being used, characteristics of a user or client characteristics of a client device used by the user.

Example 8 is the computing system of claim 4 wherein the exposure duration processing logic is configured to enter a firewall rule on the computing system allowing the exposure of the client-facing port to the client computing system and to remove the firewall rule after the given exposure duration.

Example 9 is the computing system of any or all previous examples wherein the authentication mechanism interaction logic is configured to interact with an external authentication mechanism, as the selected authentication mechanism.

Example 10 is a computer implemented method, comprising:
receiving an access request, at a computing system authorized to access a resource server on a given resource server port, from a client computing system, the access request requesting access to the resource server;
selecting an authentication mechanism and an authorization mechanism, from a plurality of different authentication and authorization mechanisms, based on the access request;
authenticating and authorizing the access request by interacting with the selected authentication mechanism and the selected authorization mechanism; and
performing traffic forwarding by forwarding information received over a network from the client computing system on a selected client-facing port on the computing system to the resource server on the given resource server port, and by forwarding information received from the resource server through the given resource server port to the client computing system on the selected client-facing port.

Example 11 is the computer implemented method of any or all previous examples and further comprising:
selecting an authentication mechanism, from a plurality of different authorization mechanisms, based on the access request; and
authorizing the access request by interacting with the selected authorization mechanism.

Example 12 is the computer implemented method of any or all previous examples and further comprising:
maintaining a pool of available ports;
selecting the selected client-facing port from the pool of available ports.

Example 13 is the computer implemented method of any or all previous examples and further comprising:
exposing the client-facing port to the client computing system;
enabling the traffic forwarding logic to perform the traffic forwarding for a given exposure duration; and
after the given exposure duration, disabling the exposure of the client-facing port and the traffic forwarding.

Example 14 is the computer implemented method of any or all previous examples and further comprising:
identifying the given exposure duration based on an identity of the resource server for which access is requested in the access request.

Example 15 is the computer implemented method of any or all previous examples and further comprising:
identifying the given exposure duration based on a type of access requested in the access request.

Example 16 is the computer implemented method of any or all previous examples wherein exposing the client-facing port to the client computing system comprises:
generating a firewall rule on the computing system allowing the exposure of the client-facing port to the client computing system and wherein disabling the exposure comprises removing the firewall rule after the given exposure duration.

Example 17 is the computer implemented method of any or all previous examples and further comprising:
exposing a web application to the client computing system, wherein receiving an access request comprises receiving the access request from the client computing system through the web application exposed by the web application exposing logic.

Example 18 is the computer implemented method of any or all previous examples wherein authenticating the access request comprises:
interacting with an external authentication mechanism, as the selected authentication mechanism, to authenticate the access request.

Example 19 is a computing system authorized to access a resource server on a given resource server port, the computing system comprising:
client interaction logic that receives an access request, from a client computing system, requesting access to the resource server;
authentication/authorization mechanism interaction logic that interacts with a selected authentication and a selected authorization mechanism, selected based on the access request, and performs an authentication operation to authenticate information corresponding to the access request and an authorization operation to authorize the access request;
port maintenance logic configured to maintain a pool of available ports;
port selection logic configured to interact with the port maintenance logic to select a client-facing port from the pool of available ports;
traffic forwarding logic that performs traffic forwarding by forwarding information received over a network from the client computing system on the selected client-facing port on the computing system to the resource server on the given resource server port, and by forwarding information received from the resource server through the given resource server port to the client computing system on the selected client-facing port; and
exposure duration processing logic configured to expose the client-facing port to the client computing system and to enable the traffic forwarding logic to perform the traffic forwarding for a given exposure duration, after which the exposure of the client-facing port and the traffic forwarding are no longer enabled.

Example 20 is the computing system of any or all previous examples and further comprising:
web application exposing logic configured to expose a web application to the client computing system, the computing system receiving the access request from the client computing system through the web application exposed by the web application exposing logic.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A cloud computing system comprising:
at least one processor; and
memory storing instructions executable by the at least one processor, wherein the instructions, when executed, cause the cloud computing system to:
receive, by a server component of the cloud computing system, an indication of an access request associated with a client computing system, wherein the access request requests access to a resource server;
determine that the client computing system is authorized to access the resource server;
select, by the server component based on the determination, a selected client-facing port from a plurality of client-facing ports on the server component;
generate an access rule configured to permit access by the client computing system to the selected client-facing port for an exposure duration defined by the access rule;
send, to the client computing system, port information that identifies the selected client-facing port;
receive, from the client computing system, first information on the selected client-facing port on the server component;
based on the access rule, forward the first information from the server component to the resource server through a resource server port of the resource server;
receive second information from the resource server through the resource server port; and
forward the second information to the client computing system on the selected client-facing port.

2. The cloud computing system of claim 1, wherein the instructions cause the cloud computing system to:
execute a web application;
receive, by the web application, the access request, the first information, and the second information; and
forward the second information to the client computing system; and
the resource server is remote from the server component over a wide area communication network.

3. The cloud computing system of claim 1, wherein the instructions cause the cloud computing system to:
receive the access request using a client interaction component local to a traffic forwarding component that performs traffic forwarding between the client computing system and the resource server.

4. The cloud computing system of claim 1, wherein the instructions cause the cloud computing system to:
expose the selected client-facing port to the client computing system for the exposure duration; and
after the exposure duration, disable exposure of the selected client-facing port to the client computing system.

5. The cloud computing system of claim 4, wherein the instructions cause the cloud computing system to:
define the exposure duration based on an identity of the resource server;
based on the access request, select an authentication mechanism; and
verify an identity of the client computing system.

6. The cloud computing system of claim 4, wherein the instructions cause the cloud computing system to:
define the exposure duration based on a type of access requested in the access request.

7. The cloud computing system of claim 4, wherein the access rule comprises a firewall rule, and the instructions cause the cloud computing system to:
define the firewall rule on the cloud computing system, the firewall rule allowing the exposure of the selected client-facing port to the client computing system; and
remove the firewall rule after the exposure duration.

8. A method performed by a computing system, the method comprising:
receiving, by a server component of a cloud computing system, an indication of an access request associated with a client computing system, the access request requesting access to a resource server;
verifying that the client computing system is authorized to access the resource server;
selecting, by the server component based on the verification, a selected client-facing port on the server component and generate an access rule configured to permit access by the client computing system to the selected client-facing port for an exposure duration defined by the access rule;
sending, to the client computing system, port information that identifies the selected client-facing port;
receiving, from the client computing system, first information on the selected client-facing port on the server component;
based on the access rule, forwarding the first information from the server component to the resource server through a resource server port of the resource server;
receiving second information from the resource server through the resource server port; and
forwarding the second information to the client computing system on the selected client-facing port.

9. The method of claim 8, wherein the access request includes a server identifier that identifies the resource server, and further comprising:
selecting resource server based on the server identifier.

10. The method of claim 9, and further comprising:
maintaining a pool of available ports; and
selecting the selected client-facing port from the pool of available ports.

11. The method of claim 8, wherein the computing system comprises a cloud computing system, and further comprising:
exposing the selected client-facing port to the client computing system for the exposure duration; and
after the exposure duration, disabling exposure of the selected client-facing port to the client computing system.

12. The method of claim 11, and further comprising:
based on a type of access requested in the access request, identifying the exposure duration.

13. The method of claim 11, wherein
the access rule comprises a firewall rule configured to allow the exposure of the selected client-facing port to the client computing device, and
disabling the exposure comprises removing the firewall rule after the exposure duration.

14. The method of claim 8, wherein the computing system comprises an allowed client server having a web application to the client computing device, wherein receiving an access request comprises receiving the access request from the client computing device through the web application exposed by the web application of the allowed client server.

15. The method of claim 8, and further comprising:
interacting with an external authentication mechanism to authenticate the access request.

16. A server computing system comprising:
at least one processor; and
memory storing instructions executable by the at least one processor, wherein the instructions, when executed, provide on the server computing system:
a client interaction component configured to receive, from a client computing system, an access request requesting access to a resource server;
a port maintenance component configured to maintain a pool of available ports;
a port selection component configured to select a client-facing port from the pool of available ports;
a traffic forwarding component configured to:
generate an access rule configured to permit access by the client computing system to the selected client-facing port for an exposure duration;
send, to the client computing system, port information that identifies the selected client-facing port,
receive first information from the client computing system on the selected client-facing port on the server computing system,
forward the first information to the resource server on a resource server port corresponding to the resource server,
receive second information from the resource server through the resource server port corresponding to the resource server, and
forward the second information to the client computing system on the selected client-facing port; and
an exposure duration processing component configured to:
identify an exposure duration; and
expose the client-facing port to the client computing system and to enable the traffic forwarding component to perform traffic forwarding for the exposure duration, after which exposure of the client-facing port and the traffic forwarding are disabled.

17. The server computing system of claim 16, wherein the instructions provide:
a web application exposing component configured to expose, to the client computing system, a web application configured to receive the access request from the client computing system through the web application.

18. The server computing system of claim 16, wherein the traffic forwarding component is configured to perform the traffic forwarding by forwarding the first information to the resource server over a wide area network and to receive the second information from the resource server over the wide area network.

19. The server computing system of claim 16, wherein the server computing system comprises a cloud computing system, and the client interaction component is local to the traffic forwarding component that performs the traffic forwarding.

20. The server computing system of claim 16, wherein the access rule comprises a firewall rule, and the exposure duration processing component is configured to:
enter the firewall rule on the server computing system, the firewall rule allowing the exposure of the client-facing port to the client computing system; and
remove the firewall rule after the exposure duration.

* * * * *